INVENTOR
GEORGE G. HOBERG
BY
Donald W. Phillion
ATTORNEY

April 5, 1960 G. G. HOBERG 2,932,008
MATRIX SYSTEM
Filed Oct. 15, 1952 7 Sheets-Sheet 2

INVENTOR
GEORGE G. HOBERG
BY
*Donald W. Phillion*
ATTORNEY

INVENTOR
GEORGE G. HOBERG
BY
ATTORNEY

INVENTOR
GEORGE G. HOBERG
BY
ATTORNEY

April 5, 1960     G. G. HOBERG     2,932,008
MATRIX SYSTEM
Filed Oct. 15, 1952     7 Sheets-Sheet 5
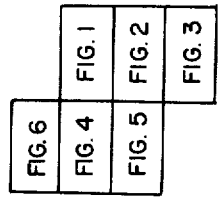
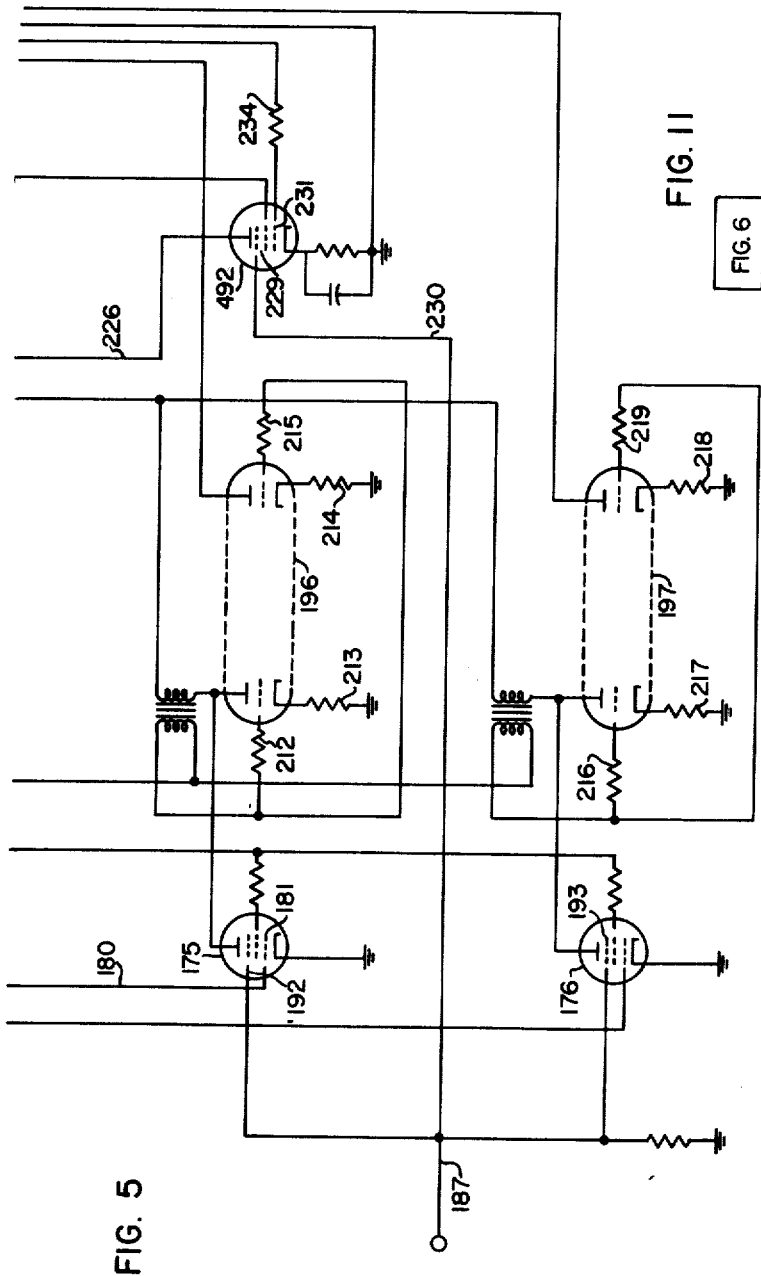
INVENTOR
GEORGE G. HOBERG
BY
*Donald W. Phillion*
ATTORNEY

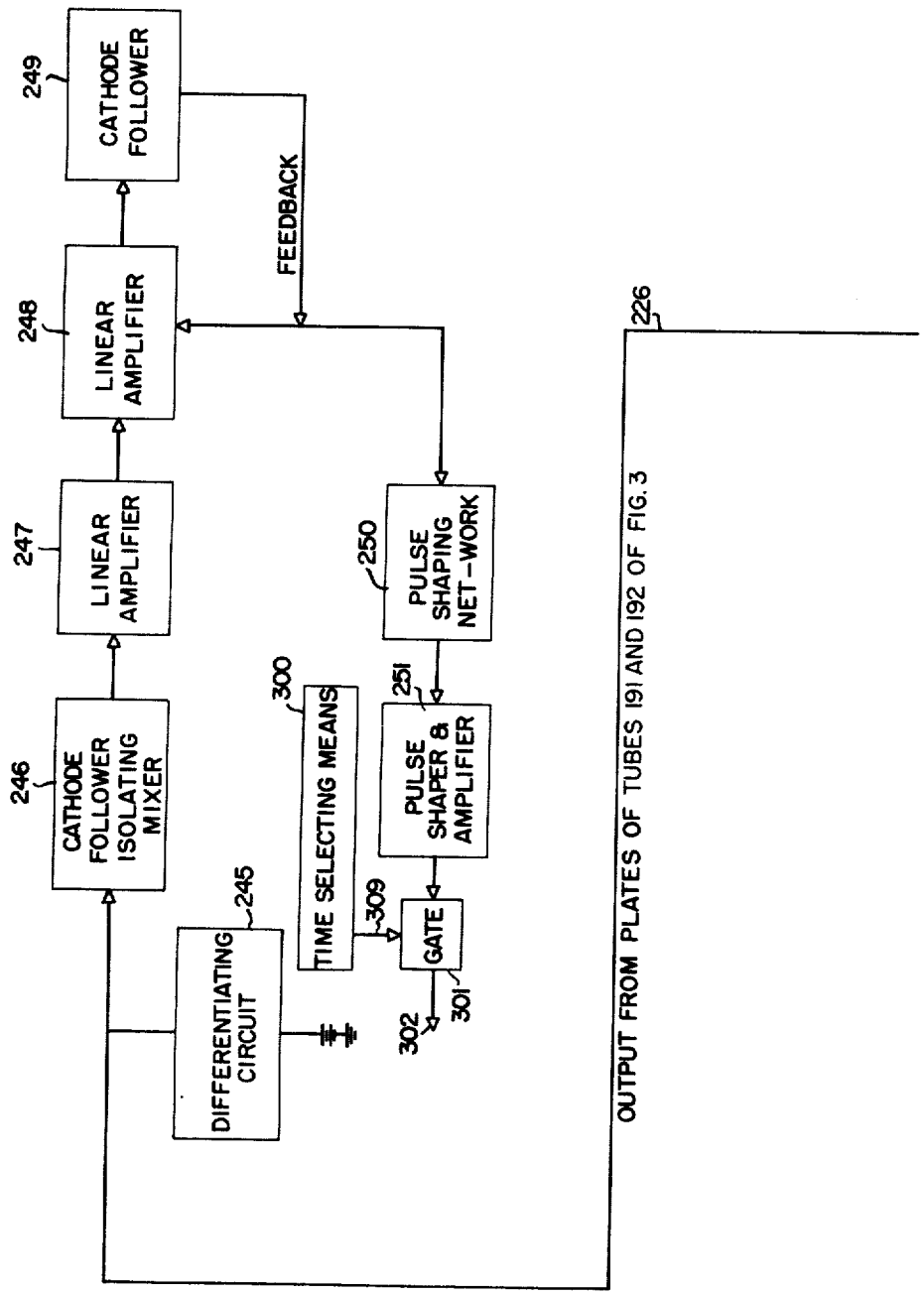

April 5, 1960 G. G. HOBERG 2,932,008
MATRIX SYSTEM
Filed Oct. 15, 1952 7 Sheets-Sheet 7
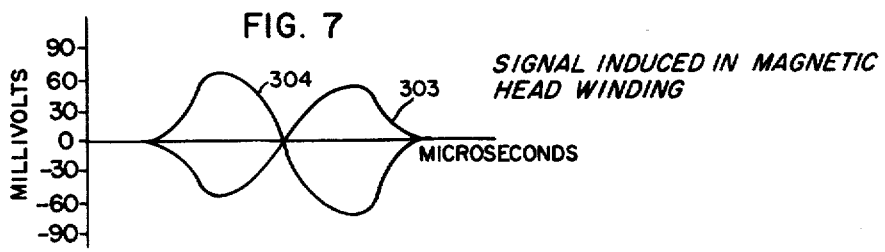
FIG. 7 — SIGNAL INDUCED IN MAGNETIC HEAD WINDING
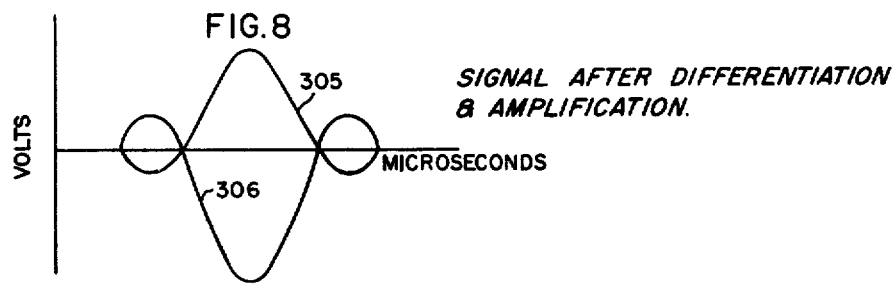
FIG. 8 — SIGNAL AFTER DIFFERENTIATION & AMPLIFICATION.
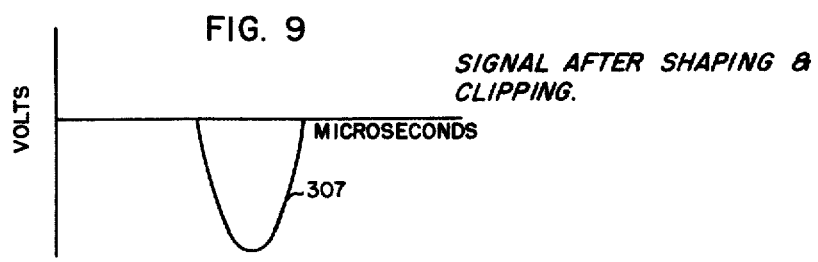
FIG. 9 — SIGNAL AFTER SHAPING & CLIPPING.
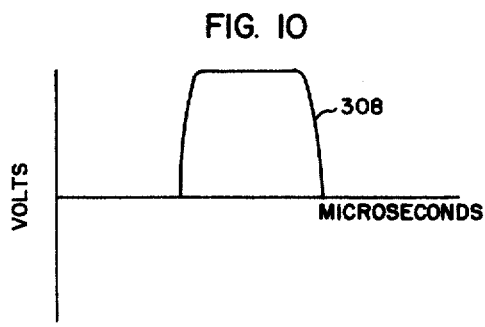
FIG. 10
INVENTOR
GEORGE G. HOBERG
BY
Donald W. Phillion
ATTORNEY

United States Patent Office 2,932,008
Patented Apr. 5, 1960

2,932,008

MATRIX SYSTEM

George G. Hoberg, Drexel Hill, Pa., assignor to Burroughs Corporation, Detroit, Mich., a corporation of Michigan Application October 15, 1952, Serial No. 315,892

44 Claims. (Cl. 340—174)

This invention relates generally to apparatus for the entry and the extraction of information into and from a magnetic storage system having a plurality of information entry means and information extraction means.

Of the many methods and systems for storing information, magnetic recording has evolved as one of the more expedient means of storing said information. Magnetic recording has the advantages of permanent storage without a continuous power supply and provides convenient means for bulk storage of data with a good access time. One of the more recent developments in magnetic storage is a magnetic drum storage system as disclosed in U.S. Patent 2,540,654 and comprises a rotatable drum coated with magnetic material. Magnetic reading heads are positioned near the periphery of the drum for the purpose of recording information onto the drum surface and subsequently reading information from such surface. Portions of the drum which pass under all but one of the recording and reading heads are identified as information tracks. Another reading head is located near the periphery of the drum to perform the function of timing. The portion of the surface of the drum passing under this reading head is known as the timing track and performs the function of defining the position of the drum at any moment in time while the drum is rotating, thus enabling identification of the angular position, sometimes referred to as the address, of a particular small area on the surface of the drum on which information is recorded.

The magnetic heads associated with the magnetic drum are composed of conducting wire coils, or windings, wound around a magnetic core. Information is stored on the drum surface in the form of positive magnetic remanence or negative magnetic remanence. In the preferred embodiment of this invention a single coil on the core of each magnetic head is tapped to provide a third terminal, or is connected to associated electric circuit elements in such a way as to provide the equivalent of a third terminal on the winding for purposes of voltage division and introduction of input voltages. Positive magnetic remanence is created by having a current flow through the tap of the coil to a first terminal of the winding and negative magnetic remanence is obtained by having a current flow from the tap to the other terminal of the magnetic winding. The storage capacity of such drums is very large; they can store up to the order of several hundred thousand bits of information. Ordinarily, one data read-in means and one data read-out means are associated with each data storage track. The same magnetic head performs both the functions of reading in data and reading out data. When it is desired to enter information into the magnetic-drum storage system a particular address or location on the drum must be chosen. This requires circuitry for selecting the correct head and for entering the information at a definite point in time by means of a pulse of current of appropriate character derived from the synchronizing track or equivalent source by appropriate gating means. The reading out of information from a magnetic drum can be accomplished by a gating means operable by a properly timed synchronizing pulse and a signal induced in the head by means of remanent magnetization representing stored information on the drum surface. Amplification and pulse-shaping means are then required to convert the signal thus obtained to one of proper form for further use. Under present circuit techniques each head has a separate read-in external circuit means and a separate read-out external circuit means. This involves a large amount of circuitry which presents a space problem as well as high initial cost and maintenance expenses. It would mark a definite improvement in the art of multiple head storage systems if the amount of read in and read out circuitry associated with the magnetic drum storage systems could be substantially decreased without impairing the efficiency or speed of operation of said storage systems.

It is an object of this invention to provide a means of entering data into and extracting data from a magnetic drum storage system, or other magnetic storage system, utilizing only a small portion of the circuitry heretofore necessary to perform such functions.

It is a further object of this invention to reduce the amount of space required to house the read in and read out circuitry necessary for the entering and extraction of information into a magnetic drum or other magnetic storage medium.

A third object is to provide more economical means than have heretofore been known for entering and extracting information from a magnetic drum or other magnetic storage medium.

Another object of this invention is to improve magnetic storage systems generally.

In accordance with one embodiment of the invention a plurality of magnetic heads are electrically arranged in a two-dimensional array to form what may be considered for electrical purposes as orthogonal rows and columns of magnetic heads. There is provided a means for selectively applying predetermined voltages to center taps of windings in any given column of magnetic heads. A first end terminal of each of the windings of the magnetic heads in each row are connected to the anode of an asymmetrically conducting two-terminal device individual thereto, the cathode of said asymmetrical device, or diode, being connected to a common first point individual to the associated row. The second end terminals of the windings of any given row of magnetic heads are each electrically connected to the anodes of an asymmetrical device individual thereto, the cathodes of all said asymmetrical devices being connected to a second common point. Each row of magnetic heads has a read-out means individual thereto electrically connected between said first common point and said second common point individual to said given row. Further, each row of magnetic heads has a first read-in means individual thereto connected to the said first common point and a second read-in means individual to each row of magnetic heads connected to said second common point. Obviously, if all the involved asymmetrical devices were reversed so that cathodes were connected to terminals above specified as being connected to anodes, and vice versa, the same considerations apply, except that in the gating means to be discussed later the effective voltage polarities required for operation would have reversed.

In accordance with one feature of the invention the asymmetrical devices associated with the first and second terminals of each of the windings of the magnetic heads perform the function of electrically isolating a magnetic head from every other magnetic head when that particular magnetic head is being utilized to read information from the drum. This is due to the arrangement of asymmetrical devices associated with the windings of a given row of magnetic heads.

In one desirable embodiment of the invention the center taps of all of the heads in a given column are connected to a common terminal. This common terminal is in turn connected through an impedance to an electrical reference potential point, whose potential does not vary appreciably during the duration of the current pulse used for reading in a unit of information, and external means is provided to cause this impedance to have either a high value or a low value. The impedances for the various columns must be such that only the selected column, or in unusual applications, the selected columns, corresponding to the head or heads to be used for reading into the drum, has or have a sufficiently low value to permit passage into the head of sufficient current to affect properly the state of magnetization of the appropriate portion of the drum surface. All other unselected columns must have series impedances to the electrical reference of sufficiently high value so that no adverse effect is produced on the remanent magnetization of address locations then under heads in said other unselected columns.

These and other objects and features of the invention will be more fully understood from the following detailed description when read in conjunction with the drawings in which:

Figs. 4 and 5 are a schematic diagram of circuitry adapted to enter information into the magnetic storage system and a portion of the circuitry required to extract information from the magnetic storage system;

Fig. 6 is a block diagram of circuitry required to amplify and shape pulse information extracted from the magnetic storage system;

Fig. 7 is a curve of the voltage signals induced in a magnetic head winding;

Fig. 8 is a curve of the signals of Fig. 7 after differentiation and amplification;

Fig. 9 is a curve of one of the signals of Fig. 8 after shaping and clipping;

Fig. 10 is a curve of one of the signals shown in Fig. 9 after reshaping; and

Fig. 11 is a chart showing the arrangement of Figs. 1, 2, 3, 4, 5, and 6.

Figure 1:
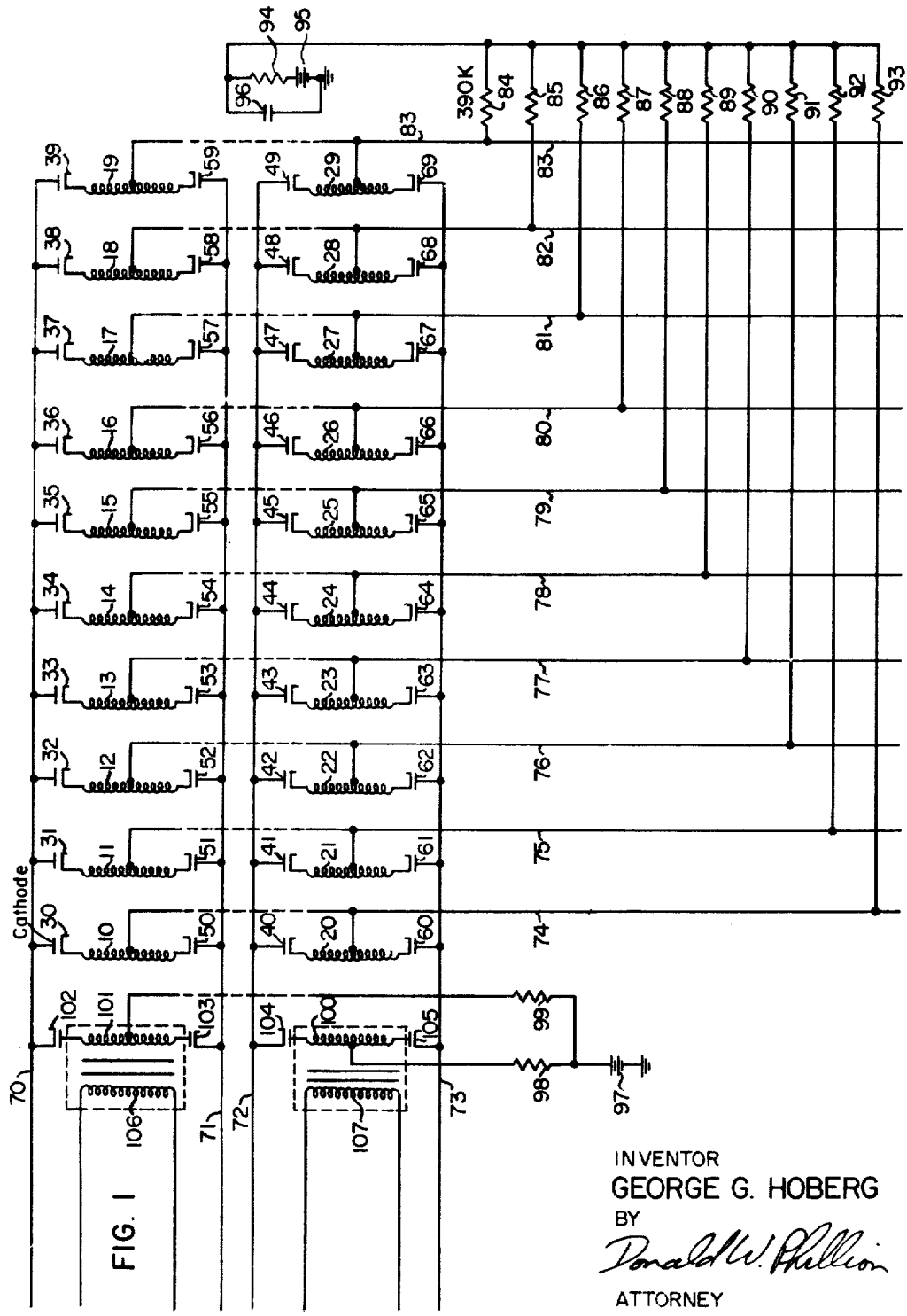
Fig. 1 shows a schematic diagram of magnetic elements, which may, for example, be magnetic heads, arranged electrically in a rectangular coordinate manner and the asymmetrically conducting means associated with each of such elements.

Referring now to Fig. 1, there is shown therein a schematic sketch of the rectangular array of a plurality of magnetic heads arranged in rows and columns. As shown in Fig. 1, there are two rows of magnetic heads and ten columns of magnetic heads. It is to be noted, however, that the system is flexible and any reasonable number of rows and columns may be utilized. For example, one hundred magnetic heads can be arranged in ten rows and ten columns. Each magnetic head is represented by the symbol for a center tapped winding. More specifically, magnetic heads are represented by center tapped windings 10, 11, 12, 13, 14, 15, 16, 17, 18 and 19 in the top row of the heads shown in Fig. 1 and center tapped windings 20, 21, 22, 23, 24, 25, 26, 27, 28 and 29 of the bottom row of the magnetic heads. The windings 10 through 29 are each wound around a magnetic core to form a magnetic head. Both of the end terminals of each of the windings 10 through 29 have an asymmetrical device connected thereto. For example, the upper terminals of windings 10 through 29 are connected respectively to the anodes of diodes 30 through 49. The bottom terminals of magnetic head windings 10 through 29 are connected respectively to the anode of asymmetrical devices 50 through 69. The cathode of diodes 30 through 39 associated respectively with the upper terminals of windings 10 through 19 are connected to a common conductor 70, the cathode of the asymmetrical devices 50 through 59 associated respectively with magnetic head windings 10 through 19 are connected to a common conductor 71, the cathode of the asymmetrical devices 40 through 49 associated respectively with magnetic head windings 20 through 29 are connected to common conductor 72, and the cathode of asymmetrical devices 60 through 69 associated respectively with magnetic head windings 20 through 29 are connected to common conductor 73. The center taps of the magnetic head windings in each column are connected to a common terminal. For example, the midpoints of windings 10 and 20 are connected to conductor 74, the midpoints of windings 11 and 21 are connected to conductor 75, the midpoints of windings 12 and 22 are connected to conductor 76, the midpoints of windings 13 and 23 are connected to conductor 77, the midpoints of windings 14 and 24 are connected to conductor 78, the midpoints of windings 15 and 25 are connected to conductor 79, the midpoints of windings 16 and 26 are connected to conductor 80, the midpoints of windings 17 and 27 are connected to conductor 81, the midpoints of windings 18 and 28 are connected to conductor 82, and the midpoints of windings 19 and 29 are connected to conductor 83.

Separate 390,000 ohm resistors 84 through 93 are respectively connected to conductors 74 through 83. The other terminals of the resistors 84 through 93 are connected by 25 ohm resistor 94 to positive 105 volt battery source 95. A .05 microfarad capacitor 96 is shunted across series combination of resistor 94 and battery source 95.

Each of the windings 10 through 29 is, as has been discussed hereinbefore, divided into two portions determined by the location of the center tap. The upper portion of the windings as shown in Fig. 1 is utilized to read into the magnetic drum information magnetizing a specific portion of the drum in a polarity opposite the polarity the surface of the drum contains when nothing is stored therein. For purposes of clarity it will be assumed herein that this upper portion of the winding shown in Fig. 1 will be utilized to read what will be interpreted as the binary digit "1" into the magnetic storage system which will represent a state of positive remanence on that portion of the surface of the magnetic drum. Negative remanence will perform both the function of registering nothing and the storage of a "0" binary bit of information. The number of turns in each half of each head winding is 150. The asymmetrical devices 30 through 69 utilized in the preferred embodiment of the invention are germanium rectifiers of the point contact type. It is to be noted, however, that other asymmetrical devices such as junction contact germanium diodes, gas tubes, selenium rectifiers, vacuum diodes, copper oxide rectifiers, and other types of asymmetrical devices may be utilized.

When a particular magnetic head is in an unselected condition the potential of the center tap of the unselected magnetic head winding is determined by 105 volt battery source 95 and the voltage drop across the associated resistance of resistances 84 through 93. However, in the preferred embodiment described herein since there is essentially no current drainage associated with the unselected rows of magnetic heads the voltage drop across the associated resistances 84 through 93 is approximately zero and the potential of the center tap remains approximately at the positive 105 volt potential of battery source 95. For example, if the first column of magnetic heads represented by windings 10 and 20 is in an unselected condition a circuit may be traced from positive 105 volt battery source 95, through resistance 94, resistance 93, conductor 74, to the center taps of windings 10 and 20. The remainder of the circuit may be traced from positive 150 volt battery source 97, then through the parallel arrangement of resistances 98 and 99, to the center taps of transformer windings 100 and 101 respectively which provided the means for transforming read out signals to external amplification circuitry. Like the head windings, these transformer windings have negligibly small D.-C. resistance for purposes of this invention. Thus, looking specifically at the midpoints of windings 10 and 101, the potentials respectively are 105 volts and 150 volts, and the current would tend to flow from the midpoint of winding 101 to the midpoint of winding 10. However, diodes 30, 50, 102 and 103 all present high back impedances to such a flow of current, thus limiting it to a negligible value. Unless the potential of some portion of winding 10 can be raised to a value in excess of 150 volts no current can flow in the winding 10. Thus, any voltage generated in winding 10 of less than 45 volts amplitude would not appear in the read out either section of winding 101. The same statement is true of magnetic head winding 20 or of any other magnetic head winding in a non selected column of magnetic cores. Winding 106 is a transformer secondary inductively coupled to center tapped winding 101 to detect the information being read from the magnetic storage system. A typical amplitude of read back signals in winding 10, etc is 0.2 volt, which is clearly much less than the 45 volt margin provided.

Figure 2:
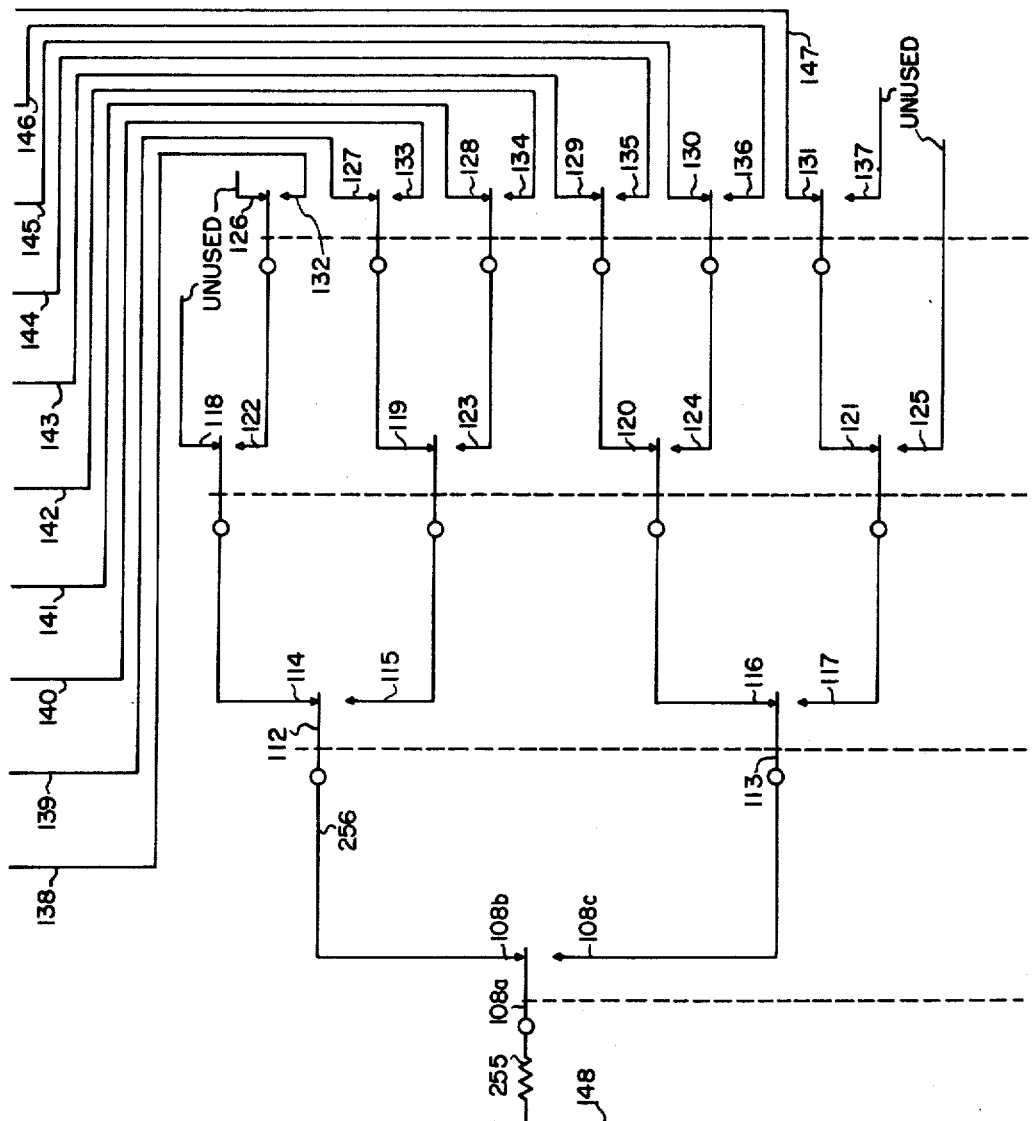
Figs. 2 and 3 show a relay column selecting means.
Figure 3:
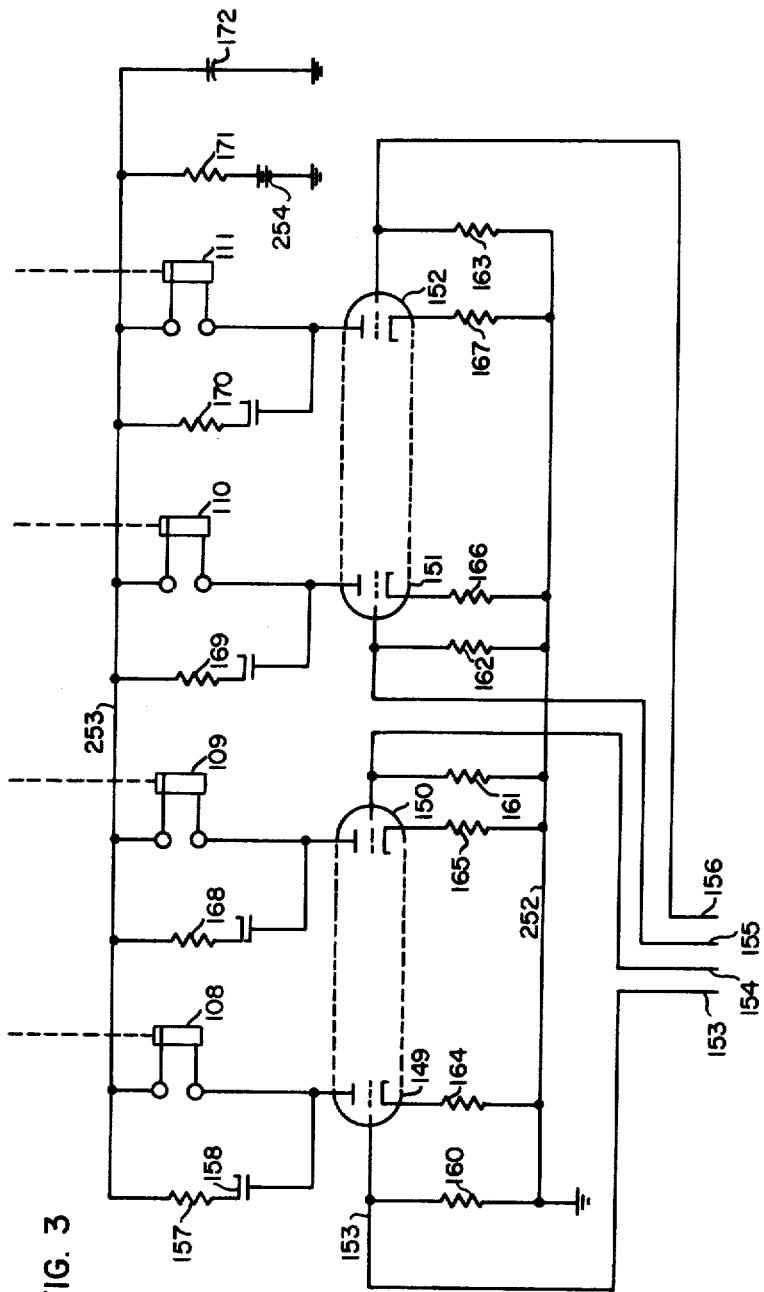

In Figs. 2 and 3 there is shown a column selecting means utilizing relays having their contacts arranged in a tree fashion. More specifically, relays 108, 109, 110, 111 (Fig. 3) operate their associated contacts (Fig. 2) in such a manner as to be able to select one column of the ten columns of magnetic reading heads by effectively lowering the value of resistance associated with the center tap bus of the selected column and by concomitantly changing its direct current potential. Associated with relay 108 are armature 108a and contacts 108b and 108c (Fig. 3). Associated with relay 109 are armatures 112 and 113 and contacts 114, 115, and 116 and 117. Relay 110 is operated to break its associated contacts 118, 119, 120 and 121 and to make its associated contacts 122, 123, 124 and 125. Relay 111 is operated to break its associated contacts 126, 127, 128, 129, 130 and 131, and to make its associated contacts 132, 133, 134, 135, 136 and 137. Since four relays are used, a total of sixteen possible selections are obtainable. Of these sixteen, only ten are actually utilized in the embodiment shown herein. The conductors 138 through 147 connect the contacts of the ten utilized positions through conductors 74 to 83, respectively, to the ten columns of magnetic heads. 250 volt battery source 148 will thus be connected to any one of the ten columns of magnetic heads by the operation of the proper ones of the relays 108 through 111. The relays 108, 109, 110 and 111 in turn are operated by the output current of amplifier tubes 149, 150, 151 and 152 respectively.

Each of the amplifying tubes 149, 150, 151, and 152 are of the type 5687 manufactured by Tung Sol Lamp Works, Inc., a corporation of Delaware. The control grids of the tubes 149 through 152 are connected respectively to input leads 153, 154, 155 and 156. The application of positive voltage signals upon the input conductors 153 through 156 in accordance with a predetermined code can be accomplished by well known means in the art such as two flip-flop circuits (not shown) with the four output terminals of the two stages of each of the two flip-flop circuits being individually connected to one of the said four leads 153 through 156.

Each of the relays 108 through 111 has a resistance and asymmetrical means connected in parallel therewith to form an arc suppression circuit for the winding of the relay coil. For example, relay 108 has resistance 157 and asymmetrical device 158 connected in parallel with the winding thereon.

The values of components in this figure are as follows:

| Resistance 157 | ohms | 6,800 |
|---|---|---|
| Resistance 160 | do | 1,000,000 |
| Resistance 161 | do | 1,000,000 |
| Resistance 162 | do | 1,000,000 |
| Resistance 163 | do | 1,000,000 |
| Resistance 164 | do | 100,000 |
| Resistance 165 | do | 100,000 |
| Resistance 166 | do | 100,000 |
| Resistance 167 | do | 100,000 |
| Resistance 168 | do | 6,800 |
| Resistance 169 | do | 6,800 |
| Resistance 170 | do | 6,800 |
| Resistance 171 | do | 6,800 |
| Capacitance 172 | microfarad | .01 |

Figure 4:
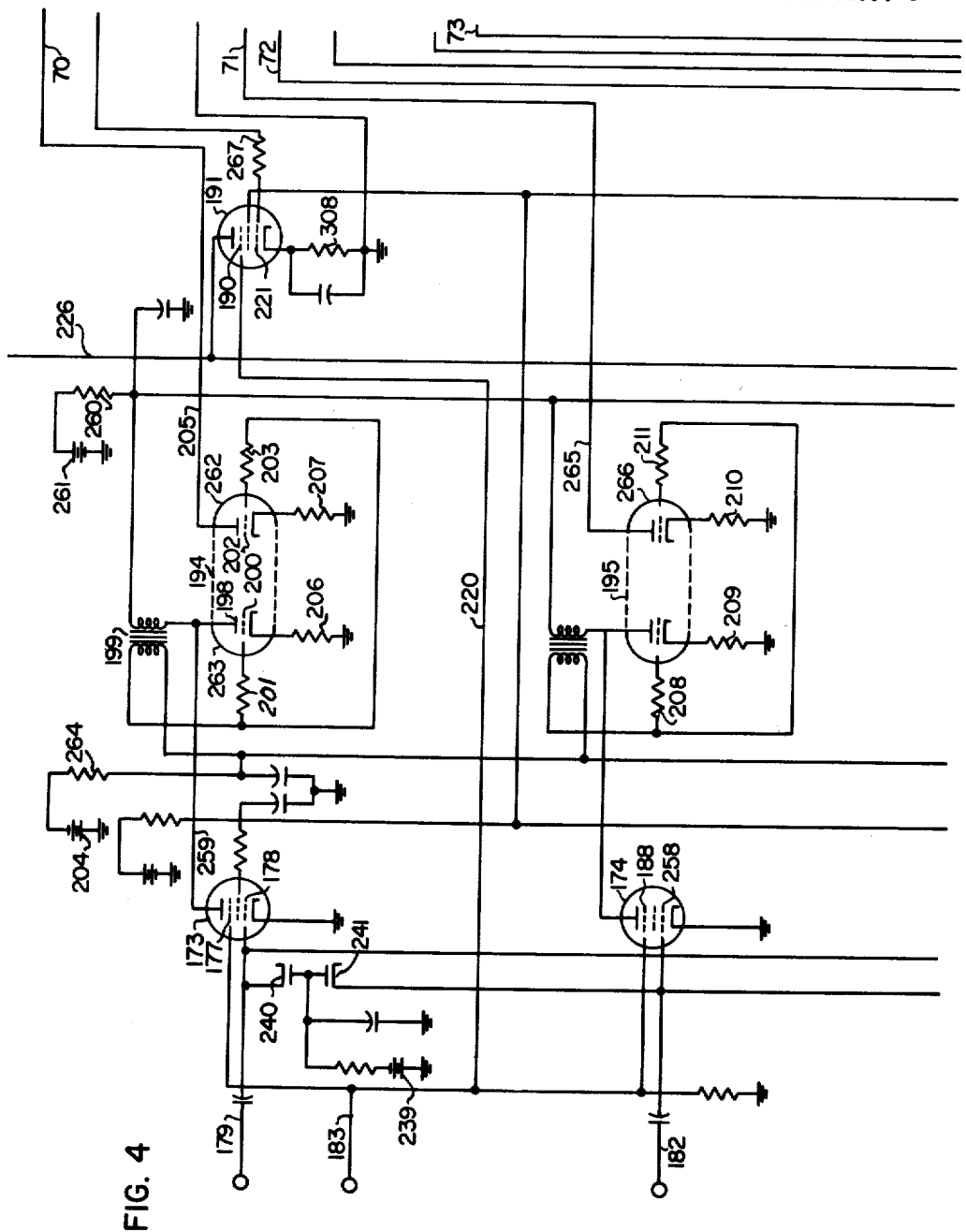

In Figs. 4 and 5 there is shown a schematic diagram of the circuitry used to read information into the desired row of magnetic heads.

Pentode tubes 173, 174, 175, and 176, of the 7AK7 type manufactured by Sylvania Electric Products, a corporation of Massachusetts, are utilized as gate tubes. In order for plate current to flow therein positive signals must be applied simultaneously to both the suppressor grid and the control grid of each tube. For example, positive signals must be applied to the suppressor grid 177 and control grid 178 of pentode gate tube 173. It is to be noted that there are two gate tubes associated with each row of magnetic heads. Thus, gate tubes 173 and 174 are associated with the upper row of magnetic heads of Fig. 1. The gate tube 173 is utilized to read in a binary digit "1" into the magnetic drum and the gate tube 174 is utilized to read a binary digit "0" into the magnetic drum storage system. A pulse representing the binary digit "1" is applied to conductor 179. This pulse is simultaneously applied to the control grids of all the gate tubes such as 173 of Fig. 4 and 175 of Fig. 5 in the system associated with introducing a binary digit "1" into the magnetic storage system. This may be seen by tracing the circuit from input conductor 179 to the control grid of tube 173, and also along conductor 180 to the control grid 181 of gate tube 175. An information pulse representative of a binary digit "0" is introduced into conductor 182. This pulse is simultaneously applied to all the control grids of gate tubes such as 174 of Fig. 4 and 176 of Fig. 5 associated with entering a binary digit "0" into the storage system.

The rows are selected by the application of positive voltage pulse upon selecting conductors such as conductors 183 and 187. An application of a voltage pulse upon conductor 183 will cause selection of the top row of magnetic heads shown in Fig. 1 whereas the application of a positive voltage pulse upon row select conductor 187 will cause selection of the bottom row of the magnetic heads shown in Fig. 1. Row select conductor 183 is connected directly to the suppressor grids 177 and 188 of tubes 173 and 174 respectively, and further is connected through conductor 220 to the suppressor grid 190 of tube 191 which is utilized when reading information out of the magnetic storage system. Referring to Fig. 5 row select conductor 187 is connected directly to the suppressor grids 192 and 193 of gate tubes 175 and 176 respectively.

It is only upon the coincidence of a positive voltage signal applied simultaneously upon the suppressor grid (normally biased below plate current cutoff) and the control grid (normally biased below plate current cutoff) of any one of the tubes 173 through 176 that a plate current of signal magnitude will be produced. It can be seen that by the choice of the proper row and the choice of the "0" binary input lead or the "1" binary input lead a particular one of the tubes 173 through 176 can be caused to produce an output signal.

It is desirable to maintain the control grids of tubes such as 173, 174, 175 and 176 (when not being pulsed) at a minimum potential of negative 15 volts. To accomplish this function the cathode of diode 240 is connected to the control grids of all the tubes such as tubes 173 and 175 utilized in reading a binary digit "1" into the magnetic storage system, and the cathode of diode 241 is connected to the control grids of all the tubes such as tubes 174 and 176 utilized to read a binary digit "0" into the magnetic storage system. The anodes of both diodes 240 and 241 are connected to negative 15 volt battery source 239.

The output signal from tubes 173 through 176 is fed into blocking oscillators individual thereto. Double triode 5687 vacuum tubes manufactured by Tung Sol Lamp Works, Inc., a corporation of Delaware, are utilized in the preferred embodiment of the invention in these blocking oscillators. Four of these double triodes 194, 195, 196 and 197 are shown in Figs. 4 and 5 and are respectively associated with gate tubes 173, 174, 175 and 176. Looking specifically at the double triode 194, a signal is received on the plate 198 from the plate of the gate tube 173. Transformer 199 connects the output signal of the plate 198 with the grid 200 through 120 ohm resistance 201 and also to the grid 202 through 120 ohm resistance 203. The operation of the blocking oscillator is conventional and need not be explained in detail herein. It should be noted, however, that negative 35 volt battery source 204 is connected to one terminal of the secondary of the transformer 199 to form a bias voltage which performs the function of preventing free running of the blocking oscillator, thus causing a single output pulse on conductor 205. The cathodes of the two halves of the double triode 194 are connected to ground through resistors 206 and 207 each having a minimum of 220 ohms and a maximum of 330 ohms. The output signal of the blocking oscillator is a current pulse which flows directly into the winding of the selected magnetic head. It is to be noted, however, that this pulse flows only through one half of the selected magnetic head winding since the conductor which is tapped into the magnetic head winding forms a portion of the circuit path of the output pulse from the blocking oscillator.

Double triodes 195, 196 and 197, also the 5687 type tube, perform functions similar to that of double triode 194 in that they are connected in blocking oscillator circuits, whose output current pulses are connected to the magnetic head windings. The circuit constants of double triodes 195, 196 and 197 in the immediate external circuitry are the same as the immediate external circuitry of double triode 194 and are listed below:

| Resistance | Watts | Value of Resistance, ohms |
| --- | --- | --- |
| 208 | 2 | 120 |
| 209 | 2 | 200 |
| 210 | 2 | 200 |
| 211 | 2 | 120 |
| 212 | 2 | 120 |
| 213 | 2 | 200 |
| 214 | 2 | 200 |
| 215 | 2 | 120 |
| 216 | 2 | 120 |
| 217 | 2 | 200 |
| 218 | 2 | 200 |
| 219 | 2 | 120 |

Pentode tubes 191 and 492 are respectively associated with the top row of magnetic heads shown in Fig. 1 and the bottom row of magnetic heads shown in Fig. 1. In the preferred embodiment described herein they are of the 6AS6 type manufactured by Western Electric Company, a corporation of New York. The pentodes 191 and 492 are operated essentially as gate tubes, both of whose suppressor grids are operated class C and whose control grids are operated class A. A small alternating or pulse-type signal superposed on the steady voltage of the control grid properly appears at the plate only if the suppressor grid potential has been raised considerably above the potential at which it can prevent plate current from flowing. For example, pentode 191 must have a positive signal impressed upon its suppressor grid 190 through conductor 220, which is connected to the row select conductor 183, if the signal induced in the selected magnetic head by the rotating drum and impressed upon its control grid 221 is to appear at its plate. The control grid 221 of tube 191 is connected through 12,000 ohm resistance 267 to the secondary winding 106 of the transformer in the top row of Fig. 1. The primary winding 101 of said transformer is center tapped by a conductor which goes to positive 150 volt battery source 97 through resistance 99. Asymmetrical devices 102 and 103 have their cathodes connected to the respective ends of the primary winding 101 and their anodes connected to the conductors 70 and 71.

Gate pentode 492 of Fig. 5 has its suppressor grid 229 connected to row-select input lead 187 through conductor 230 and its control grid 231 connected to one terminal of secondary winding 107 of the lowermost transformer of Fig. 1 through 12,000 ohm resistance 234. The primary winding 100 of the transformer is connected to positive 150 volt battery source 97 through resistance 98. Asymmetrical diodes 104 and 105 have their cathodes connected to the respective terminals of the primary winding 100 and their anodes connected respectively to conductors 72 and 73. The plates of pentodes 191 and 492 have a common conductor 226 connected to the read out amplifying means described later herein.

It is to be observed that, both during the read-in and read-out operation, when a particular magnetic head has been selected both as to row and to column within the meaning of selection hereinbefore defined, a voltage will be produced in the said selected magnetic head which will induce a corresponding voltage in the secondary winding of the corresponding output transformer such as secondary winding 106 and will produce an output current in the plate of the pentode 191. During the read-in operation, however, when a "1" or a "0" is being read into the magnetic storage system external circuitry may be utilized to disable the output current of the read amplifier system so that spurious signals caused by relatively large transient voltages which occur during the read in process are not read from the storage system.

Referring now to Fig. 6, there is shown a block diagram of the output circuitry utilized to amplify and shape the output voltage pulses at conductor 226 from the plate circuits of vacuum tubes 191 and 492 of Figs. 4 and 5. The load circuit 245 of the plates of tubes 191 and 492 of Figs. 4 and 5 is inductive in nature and operates to differentiate the pulse generated in the magnetic head. An examination of the curves 303, 304, 305, and 306 of Fig. 7 and Fig. 8 respectively show this in more detail. Curves 303 and 304 of Fig. 7 show typical signal voltages generated in the magnetic head and impressed upon the control grid of tubes such as vacuum tube 191 of Fig. 4. It is to be noted that curve 304 designates a detected signal of a first polarity and curve 303 designates a detected signal of a second polarity. The waveform represented by curve 303 (which represents a binary bit of "0") is of lower amplitude than that of 304 (which represents a binary bit of "1") because of an initial D.-C. bias of second polarity placed upon the magnetic surface. Curves 305 and 306 of Fig. 8 illustrate the differential of the voltage wave form curves 303 and 304 respectively of Fig. 7. In Fig. 6 this differentiating plate load circuit is represented by block element 245. The resulting signal from differentiating circuit 245, the wave form of which is shown in curves 305 and 306 of Fig. 8 is then fed into a cathode follower circuit 246, the output signal of which is fed into a first stage linear amplifier 247. The output circuit of the linear amplifier 247 is connected to the input circuit of a second stage linear amplifier 248. From the output circuit of the linear amplifier 248, the signal is fed into a cathode follower circuit 249, the output signal of which is fed back into the second stage linear amplifier 248 and also into a pulse shaping network 250. The output signal of the pulse shaping network is shown by curve 307 in Fig. 9. It should be noted that the signal of second polarity has been eliminated. This output signal 307 is fed into another shaper circuit 251 which performs the function of amplification and clipping to produce an output wave form such as shown by the curve 308 in Fig. 10 only upon passage of a signal of first polarity 304 under the magnetic head.

The output signal of circuit 251 forms an input signal into gating means 301. No output signal is obtained upon output lead 302 unless simultaneous signals exist upon the output terminal of circuit 251 and the output circuit of time selecting means 300 which performs the principal function of time selection of the output signal of the storage system.

It should be noted that the block diagram circuitry shown in Fig. 6 is but one of the many alternatives which may be used to obtain a desired pulse such as that shown in Fig. 10 from the signal originally induced in the magnetic head shown by curve 304 of Fig. 7. This circuitry is largely a matter of engineering design.

The operation of the apparatus will now be described in detail. It will be recollected that the surface of the drum is normally maintained with a residual magnetism of a second polarity such as will produce the output signal 303 of Fig. 7. Further, as has herein arbitrarily been defined, the storage of a binary digit "0" also is represented by a residual state of second polarity. Thus, if the magnetic storage system maintained no binary digit "1," then it could be said that every data-storing portion of the surface contained a binary digit "0." Assume that it is desired to write into a certain region of the magnetic surface a binary digit "1." Assume further that it is desired to write this binary digit "1" into one of the magnetic heads in the upper row of magnetic heads shown in Fig. 1 and, more specifically, into the magnetic head represented by winding 12 of Fig. 1.

The proper column of magnetic head must first be chosen. This is accomplished by the operation of the proper relays of relays 108 through 111 of Fig. 3 to place a positive 250 volt potential on conductor 76 of Fig. 1 which in turn is accomplished by placing in appropriate states the two flip-flop circuits (not shown) which drive terminals 153, 154, 155 and 156 (of Fig. 3). The positive voltages which constitute the outputs from two terminals of the flip-flop circuits (not shown) are impressed upon conductors 154 and 156. Since conductors 154 and 156 are respectively connected to the grids of vacuum tube triodes 150 and 152 respectively, a plate current will be caused to flow in the said tubes 150 and 152 to energize the windings of the relays 109 and 111 of Fig. 2 in circuits which may be traced as follows hereinafter. Triodes 149 and 151 are held in the non-conducting state by the negative outputs of corresponding flip-flop circuits (not shown). The specific circuit for the operation of relay 109 may be traced from ground through conductor 252, resistance 165, vacuum tube 150, winding of relay 109, conductor 253, resistance 171, to positive 150 volt source 254. Similar circuitry exists for the operation of relay 111. The operation of relay 109 opens its associated contact 114 and closes its associated contact 115. Operation of relay 111 opens its associated contact 127 and closes its associated contact 133. It is to be noted that each of relays 109 and 111 have associated therewith other contacts which are opened or closed depending on whether they are back or front contacts, but in the particular example chosen the opening and closure of these other contacts do not result in the application of the 250 volt source 148 to any of the conductors 74 through 83 of Fig. 1. A circuit may then be traced beginning in Fig. 2 from 250 volt battery source 148, through 10 ohm resistance 255, armature 108a, contact 108b, which is closed by virtue of the fact that triode 149 is not conducting, conductor 256, armature 112, contact 115, contact 119, which is closed by virtue of the fact that triode 151 is not conducting, contact 133, conductors 140 and 76, to the center taps of windings 12 and 22 of Fig. 1. The center taps of all the other windings of the magnetic heads shown in Fig. 1 are connected to 105 volt battery source 95 through one of high resistances 84, 85, 86, 87, 88, 89, 90, 92, and 93.

The means by which the proper flip-flops (not shown) corresponding to conductors 153 through 156 are selected is determined by selecting circuitry inherent in the computing apparatus associated with the invention disclosed herein. This computing apparatus is not a part of the invention and it is not deemed necessary to disclose specifically how a particular set of conductors 153 through 156 are selected.

In addition to the selection of the column of magnetic heads represented by windings 12 and 22 a proper row of magnetic heads is also selected. The means by which the selecting voltage is obtained is an inherent part of the system in which the invention described herein is used and will not be described herein since it does not constitute part of the invention. Assume that it is desired to select the top row of magnetic heads shown in Fig. 1. Consequently, a positive voltage signal will be impressed upon conductor 183 of Fig. 4. A circuit may then be traced to the suppressor grid 177 of gate tube 173, and also to the suppressor grid 188 of gate tube 174. A further circuit may be traced through conductor 220 to the suppressor grid 190 of gate tube 191 for purposes related to the reading operation to be described later. Considering now gate tubes 173 and 174 it will be remembered that gate tube 173 is utilized when writing a binary digit "1" into the binary storage system and gate tube 174 is utilized when writing a binary digit "0" into the storage system. Since, in the assumed example, it is desired to write a binary digit "1" into the circuit, gate tube 174 will produce no output. This will be so inasmuch as no positive input pulse will be applied on binary digit "0" input conductor 182 which is connected to the control grid 258 of gate tube 174. Thus, no appreciable current can flow between the cathode and the plate of tube 174. In the case of gate tube 173, however, a current will be caused to flow in the output circuit. Subsequent to the selection of the row by the application of a positive input pulse on row select conductor 183 a positive signal voltage pulse representing a binary digit "1" is impressed upon conductor 179 of Fig. 4. Conductor 179 is connected to control grid 178. Thus, positive voltage signals are simultaneously impressed upon suppressor grid 177 (from conductor 183) of tube 173 and upon control grid 178 (from conductor 179) of gate tube 173 which fulfills the conditions necessary to permit a plate current to flow through the gate tube 173. The electron flow may be traced from ground through gate tube 173, conductor 259, primary winding of transformer 199, through 10 ohm resistance 260, to the positive 250 volt battery source 261. As a result of plate current flow through tube 173 the potential of the plate thereof will decrease at a rate in accordance with the slope of the leading edge of the input pulse applied upon conductor 179 and dependent upon the characteristics of tube 173. The decrease in plate voltage of tube 173 also decreases the plate voltage of plate 198 of double triode 194 since they are connected together. A voltage is thereby induced in the secondary winding of transformer 199 which is wound so that the positive terminal of said voltage is connected to the grid 200 of double triode 194 through 120 ohm resistance 201. A plate current is thereby caused to flow in the circuit of plate 198 which induces more voltage in the secondary winding of transformer 199 which in turn makes the grid 200 more positive. It is to be noted that the positive terminal of the secondary winding of the transformer 199 is also connected to the grid 202 of the other half of double triode 194 through 120 ohm resistance 203, thus causing plate current to flow in the said other portion of tube 194 herein designated as triode 262. Referring now to the half of the double triode designated as triode 263, the plate current will continue to increase in said tube until it becomes substantially thermionically limited at which time said plate current will begin to level off, thus producing less induced voltage in the secondary winding of the transformer 199. Consequently, the potential of the grid 200 will begin to decrease and will approach zero value. This portion of the circuitry which constitutes a blocking oscillator will not be a free running blocking oscillator inasmuch as negative 35 volt battery source 204 is connected to the lower terminal of secondary winding of transformer 199 through 47 ohm resistance 264 and therefore the oscillator will cut off substantially after the generation of a single pulse. It should be understood that the plate current of the tube 262 will follow substantially the plate current of tube 263 since both grids are connected to the same voltage source which is the upper terminal of the secondary winding of the transformer 199. Thus, as the plate current increases in tube 263 it will increase in tube 262, and when it begins to decrease in tube 263 it will also decrease in tube 262. The generated pulse appearing on conductor 205 will cause electron flow in a circuit which may be traced from ground through resistance 207, tube 262, conductor 205, conductor 70, asymmetrical device 32 (of Fig. 1), through the upper portion of the magnetic head winding 12 to conductor 76, and then in Fig. 2 to conductor 140, contact 133, contact 119, contact 115, armature 112, conductor 256, conductor 108b, armature 108a, 10 ohm resistance 255, to the positive terminal of 250 volt battery source 148. It should be noted at this point that the pulse appearing on conductor 205 of Fig. 4 is a negative pulse and that the circuit just traced was from negative to positive, that is to say, the flow of the electron current was traced. The top portion of the winding 12 through which the aforementioned electron current flows is wound in such a direction as to produce what has been herein defined as a first polarity of remanent magnetic flux on a particular portion of the surface of the magnetic drum. A particular portion of the peripheral track corresponding to the head 12 may be selected by properly timing the arrival of the pulse applied to terminal 179 of Fig. 4. Reference is made to U.S. Patent 2,540,654, issued on February 6, 1951 to Arnold A. Cohen, William R. Keye, and Charles B. Tompkins for a more detailed study of the manner in which a particular address or portion of a magnetic drum can be selected.

Assume that it is desired to write a digit "0" into the circuit. This is accomplished in much the same manner as in the case of writing a binary digit "1" into the circuit, except a current is caused to be passed through the power portion (Fig. 1) of the winding 12. In order to obtain such a current flow the binary digit "0" input conductor 182 of Fig. 4 is pulsed with a positive voltage signal rather than the binary digit "1" input conductor 179. It is to be understood, of course, that the selection of the proper column and the selection of the proper row is necessary when writing into the magnetic storage system a binary digit "0" just as in the case where a binary digit "1" is read into the storage system. If the binary digit "0" input lead 182 is pulsed after the column selection and row selection has been made, a negative voltage pulse will appear on the conductor 265 associated with the tube 266 of the double triode 195. This pulse may be traced from conductor 265, along conductor 71, through asymmetrical device 52 (of Fig. 1) through the lower portion of the winding 12, conductor 76, then in Fig. 2 through conductor 140, contact 133, contact 119, contact 115, armature 112, conductor 256, contact 108b, conductor 108a, through 10 ohm resistance 255, and through positive terminal of 250 volt battery supply 148.

To read a binary bit "0" or a binary bit "1" from the magnetic storage system, respective portions on either side of the center tap of a magnetic head winding are used. Assume that a binary digit "1" is stored in the portion of the channel on the surface of the magnetic storage system corresponding to the position of the magnetic head represented by the winding 12. Before that portion of the surface of the magnetic drum which contains this binary digit "1" passes under the selected magnetic head, the proper column of magnetic heads will be chosen by the column selecting means shown in Fig. 2 in a manner as has been described hereinbefore. In addition, and still before the specific portion of the magnetic surface upon which the binary digit "1" is stored passes by the magnetic head represented by the winding 12 of Fig. 1, the proper row of magnetic heads is chosen by the application of a positive voltage impressed upon terminal 183 of Fig. 4. As mentioned hereinbefore, the timing means relating to the selection of proper column of magnetic heads and the proper row of magnetic heads is determined by external circuit means not a part of the invention and, consequently, not described herein. After the selection of the column and row, the magnetic head represented by the winding 12 will be in a condition to read from the magnetic drum. Then when that portion of the surface of the magnetic drum storing the binary digit "1" passes under magnetic head 12 a voltage will be induced in the winding 12. The winding 12 will be in a condition to read inasmuch as the potential of the center tap of the winding 12, which is connected by selected relay contacts as hereinbefore described to positive 250 volt battery source 148 of Fig. 2, is greater than the potential of conductors 70 and 71 which are connected to positive 150 volt source 97, through asymmetrical devices 102 and 103, portions of the winding 101 and resistance 99. If the potential of the center tap of the winding 12 were less than the conductors 70 and 71 the high back impedance of asymmetrical devices 32 and 52 would preclude any current flow therethrough and, consequently, any voltage induced in the winding 12 which did not raise the potential of the center tap thereof above that of conductors 70 and 71 would produce no appreciable current flow in conductors 70 and 71. However, due to the column selection the potential of the center tap of the winding 12 is greater than conductors 70 and 71 and current does flow through diodes 32 and 52 of Fig. 1. Thus, two conducting circuits may be traced. The first circuit may be traced from the 250 volt source 148 of Fig. 2 to the center tap of winding 12 of Fig. 1, diode 32, conductor 70, diode 102, top portion of the winding 101, resistance 99, to the positive terminal of 150 volt battery source 97. The second circuit may be traced from 250 volt source 148 of Fig. 2 to the center tap of winding 12, asymmetrical device 52, conductor 71, asymmetrical device 103, lower portion of the winding 101, resistance 99, to the positive terminal of 150 volt battery source 97. When the magnetic head represented by winding 12 passes over that portion of the magnetic surface containing the binary digit "1" to be read from the storage system, a signal of the form 304 shown in Fig. 7 is induced between the end terminals of winding 12. The top portion and the lower portion of the winding 101 are so wound that the voltages induced therein due to the induced voltage in the winding 12 of Fig. 1, when asymmetrical devices 32, 52, 102, and 103 are conducting as when the above described conditions exist, are additive. Thus, a voltage will be induced in the secondary winding 106 from primary winding 101. In the case where a binary digit "1" is being read out, a voltage having wave form 304 of Fig. 7 will appear at the terminal of secondary winding 106 which is connected to 12,000 ohm resistance 267 of Fig. 4. Inasmuch as a positive voltage has been impressed upon suppressor grid 190 by virtue of a positive voltage signal upon row select conductor 183, a steady current flow whose magnitude is determined by self-biasing resistor 308 and the row select potential on 183, will exist in the plate circuit of tube 191. This current flow will be modulated by the signal voltage appearing across winding 106. The wave form of the signal on conductor 226 is represented by the wave form shown in Fig. 8 which is the time derivative of the voltage induced in the magnetic head. The differentiation is produced by an inductive plate load circuit of tube 191. Said inductive load circuit is represented by block 245 of Fig. 6. A signal then passes through block elements 246, 247, 248, 249, 250 and 251 in a manner hereinbefore described.

In the instance where a binary digit "0" is read from the magnetic storage system, the process of selection and the circuit analysis is identical as in the case of the reading of a binary digit "1" from the magnetic storage system up to the induction of the voltage signal in a secondary winding 106 of the transformer shown in Fig. 1. The signal present in winding 101 will be of the form of curve 303 of Fig. 7, whose amplitude is smaller than that of curve 304 representing the binary digit "1" and whose fundamental frequency is essentially 180° out of phase with the signal of curve 304 of Fig. 7. This signal corresponding to the binary digit "0" is differentiated to form the signal shown by curve 305 of Fig. 8 and then normally eliminated by clipping at block 250 of Fig. 6, so that only the signal representing the binary digit "1" reaches the time selecting gate 301. Even if, due to unusual conditions, portions of the digit "0" signal reach gate 301 because of inadequate clipping (see Fig. 8), the timing of the spurious portions will be such that if the time selecting signal applied on conductor 309 to gate 301 is a pulse of substantially shorter duration than the pulse shown in Fig. 8, and it is properly timed, the signals representing binary digit "0" will nevertheless still be eliminated from output lead 302.

It is to be understood that the form of the invention herein shown and described is but one preferred embodiment of the same, and that various changes may be made in circuit elements, circuit arrangements, type circuits, potentials, and current values utilized without departing from the spirit or scope of the invention.

I claim:

1. A dynamic magnetic storage system comprising a moving surface coated with a magnetic material, a plurality of magnetic heads adapted to record and extract information, each of said magnetic heads comprising a magnetic core and a winding thereon, first means for electrically dividing said windings, said plurality of heads being electrically arranged in a rectangular coordinate array of rows of heads and columns of heads, second means to apply a predetermined voltage source having a predetermined series impedance to the said first means of all the windings of any given column of heads, a first plurality of asymmetrical devices connecting first terminals of each of said windings of the magnetic heads in a given one of said individual rows to a first common point individual to said given row of magnetic heads, a second plurality of asymmetrical devices connecting the second terminals of each of said windings of the magnetic heads in a given one of said rows of magnetic heads to a second common point, the terminals of a first polarity of said first and second pluralities of asymmetrical devices each being individually connected to the associated terminal of the associated winding, a plurality of information read out means one each individually connected electrically across said first and second common points of each row, a plurality of first information read in means one each individually connected to the said first common point of each row, and a second plurality of information read in means one each individually connected to the said second common point of each row.

2. A dynamic magnetic storage system in accordance with claim 1 in which each of said plurality of information read out means comprises a first impedance connected to the said first common point of the associated row, a second impedance connected to the said second common point of the associated row, and potential means associated with said first and second impedance.

3. A dynamic magnetic storage system in accordance with claim 1 in which each of said plurality of information read out means comprises a first impedance connected to one of said first and second common point of the associated row.

4. A dynamic magnetic storage system in accordance with claim 1 in which each of said plurality of information read out means comprises a first asymmetrical device having its terminal of a first polarity connected to the said first common point of the associated row, a second asymmetrical device having its terminal of a first polarity connected to the said second common point of the associated row, and a divided impedance means connected between the second polarity terminals of said first and second asymmetrical devices, and potential means associating the dividing point of said impedance with said first means for electrically dividing the windings of the heads of the associated row of heads.

5. A magnetic storage system comprising a plurality of magnetic head means adapted to record and extract information into and from said magnetic storage system by magnetic induction, said magnetic head means each comprising a tapped winding, said magnetic heads being electrically arranged in a rectangular coordinate manner of rows and columns, each of said magnetic head windings comprising a first end terminal and a second end terminal and an intermediate tap, a plurality of first common terminals each individual to one of said rows of magnetic heads, a plurality of second common terminals each individual to one of said rows of magnetic heads, a first plurality of asymmetrical devices individually connecting said first terminals of said magnetic head windings to the associated one of said first common terminals, a second plurality of asymmetrical devices individually connecting said second terminals of said magnetic head windings to the associated one of said second common terminals, the terminals of one polarity of said first and second pluralities of asymmetrical devices being connected to the associated common terminal, a first plurality of high impedances normally connected to individual ones of the taps in each said columns, a second plurality of low impedance paths individually associated with each of the taps in each of said columns but not normally connected thereto, a first potential means, switching means for connecting the taps of the windings of a selected one of said columns to said potential means through the associated one of said second low impedance paths, a second means to select a given row of magnetic heads, a third means to apply input pulses on the first common terminal of a selected row of magnetic heads, a fourth means to apply input pulses on the second common terminal of a selected row of magnetic heads, and a plurality of output circuits each responsive to all of the magnetic heads of one of said rows and adapted to detect voltage signals induced in a magnetic head of said row selected by said switching means and said second means.

6. A combination in accordance with claim 5 in which said plurality of output circuits comprises a plurality of tapped impedances each individual to one of said rows of magnetic heads, a third plurality of asymmetrical devices individually connecting first terminals of said tapped impedances to the associated one of said first common terminals, a fourth plurality of asymmetrical devices individually connecting the second terminals of said tapped impedances to the associated one of said second common terminals, said third and fourth plurality of asymmetrical devices having their terminals of said one polarity connected to the associated terminal of the associated tapped impedance.

7. A magnetic storage system comprising magnetic storage means, a plurality of first means to write a first type of information into said storage means, a plurality of second means to write a second type of information into said storage means, said pluralities of first and second means being further adapted to dynamically read information of said first and second types from said magnetic storage means, said first means being electrically arranged in a rectangular coordinate manner to form an array of rows and columns, said second means being arranged in a rectangular coordinate manner to form an array of rows and columns, each of said first means in a particular position in its rectangular coordinate array being electrically associated with one of said second means having a corresponding position in its rectangular coordinate array, a first common terminal, a second common terminal, a plurality of first asymmetrical devices individually connecting each of said first means in any given row of said first means to said first common terminal individual to said first row, a plurality of second asymmetrical devices individually connecting each of said second means in any given row of said second means to said second common terminal individual to said given row, said asymmetrical devices each having first and second terminals, a third means adapted to selectively condition a given column of said first means or said second means to write information into said magnetic storage means or to read information from said magnetic storage means, a fourth means adapted to condition a selected row of said first and second means to read or write information, a fifth means adapted to apply an information pulse onto a selected one of said common terminals, the said third means and the said fourth means cooperating to permit a current flow through a selected one of said first or second means, and a plurality of output circuits each electrically connected across the first and second common terminals of one of said rows and adapted to detect voltage signals induced in one of said first or second means selected to said third and fourth means.

8. A magnetic storage system in accordance with claim 7 in which said plurality of output circuits comprises a plurality of tapped impedances each individually associated with one of said rows of magnetic heads, a third plurality of asymmetrical devices individually connecting first terminals of said plurality of tapped impedances to the said first common terminal of the associated row, a fourth plurality of asymmetrical devices individually connecting second terminals of said plurality of tapped windings to the said second common terminal of the associated row, and in which said third means comprises a first potential means adapted to be impressed on the first and second means in any selected column, said first potential means performing the function of making the terminals of first polarity of the asymmetrical devices associated with the selected first and second means positive with respect to the potential of the terminals of second polarity of said associated asymmetrical devices so that electric current can flow through said selected first and second means.

9. A magnetic storage system in accordance with claim 7 in which said third means comprises a first potential means, said first potential means cooperating with a simultaneous pulse from said fifth means applied on a selected one of said common terminals to cause a current flow through the said first or second means selected by said fourth and third means, and said third means further cooperating with said fourth means to permit a current flow from the said selected first and second means through said plurality of output circuits when a voltage is induced in such first or second means.

10. A magnetic storage system comprising a magnetic storage means, a plurality of first means electrically arranged in a rectangular coordinate array of rows and columns and adapted to write inforamtion of a first type into said magnetic storage means, a plurality of second means arranged in a rectangular coordinate array of rows and columns and adapted to write information of a second type into said magnetic storage system, means, each of said first means in a particular position in the rectangular coordinate array being electrically associated with one of said second means having a corresponding position in its rectangular coordinate array, a first plurality of asymmetrical devices connecting all the said first means in any given row to a first common terminal individual to said row, a second plurality of asymmetrical devices electrically connecting all the said second means in any given row to a second common terminal individual to said given row, switching means adapted to present a low impedance to a selected column of said first or second means, third means when energized adapted to selectively transmit an information pulse to said first or second common terminal associated with a selected one of said rows of said first or second means, fourth means to electrically select a given row of said first or second means, said switching means and said fourth means cooperating to condition the first means and second means of a particular coordinate to conduct a current therethrough when said third means is energized, said first and second means being further adapted to read information out of said magnetic storage means, and a plurality of fifth means one each individually associated with each row of said first or second means and adapted to detect information read from said magnetic storage means by said first or second means, each of said fifth means comprising an impedance means connected between said first common terminal and said second common terminal of the associated row.

11. A magnetic storage system comprising magnetic storage means, a plurality of magnetic head means adapted to record and extract information into and from said magnetic storage means by magnetic induction, each of said magnetic head means comprising a winding, a first means for electrically dividing each of said windings into a first portion and a second portion, said plurality of heads being arranged electrically in a rectangular coordinate array of rows and columns, a first circuit means to selectively condition the said first means of a given column of windings for the entry and extraction of information, a second circuit means adapted to condition the entry or extraction of information into or from the said storage means by means of a given row of magnetic heads, a third circuit means electrically connected across each of the magnetic heads of said given row and adapted to extract information from said storage means by means of a specific magnetic head of said row determined by said first circuit means and said second circuit means, a fourth circuit means associated with the first portion of said divided winding and adapted to read a first type of information into said magnetic storage means by means of a selected magnetic head, a fifth circuit means associated with the second portion of said divided winding and adapted to read information of a second type into said magnetic storage means by means of a selected magnetic head, said system comprising a first plurality and a second plurality of asymmetrical devices associated with each row of magnetic head windings, said first plurality of asymmetrical devices connecting first end terminals of each of said magnetic head windings in the associated row to a first common terminal individual to said associated row, said second plurality of asymmetrical devices connecting second end terminals of each of said magnetic head windings in the associated row to a second common terminal individual to said associated row, said first common terminal being associated with said third circuit means and said fourth circuit means, and said second common terminal being associated with said third circuit means and said fifth circuit means.

12. A magnetic storage system comprising magnetic storage means, a plurality of magnetic head means adapted to record and extract information into and from said magnetic storage means by magnetic induction, each of said magnetic head means comprising a winding, a first means for electrically dividing each of said windings into a first portion and a second portion, said plurality of heads being arranged electrically in a rectangular coordinate array of rows and columns, a first circuit means to selectively condition the said first means of a given column of windings for the entry and extraction of information, a second circuit means adapted to condition the entry or extraction of information into or from the said storage means by means of a given row of magnetic heads, a third circuit means respective to all of the magnetic heads of one of said rows and adapted to extract information from said storage means by means of a specific magnetic head of said row determined by said first circuit means and said second circuit means, a fourth circuit means associated with the first portion of said divided winding and adapted to read a first type of information into said magnetic storage means by means of a selected magnetic head, a fifth circuit means associated with the second portion of said divided winding and adapted to read information of a second type into said magnetic storage means by means of a selected magnetic head in which said second circuit means is adapted to supply a conditioning voltage, in which said third circuit means comprises a first gate circuit means operable by a voltage signal induced simultaneously in said selected magnetic head and by the said conditioning voltage produced by said second circuit means, and in which said fourth circuit means comprises a second gate circuit means having a first input and a second input thereto, said second gate circuit means operable in response to the simultaneous application of a voltage pulse upon said first input and the said conditioning voltage from said second circuit means upon said second input, and in which said fifth circuit means comprises a third gate circuit having a first and second input means thereto, said third gate circuit means operable in response to the simultaneous application of a votlage pulse upon said first input means and a voltage pulse from said second circuit means upon said second input means.

13. A magnetic storage system comprising magnetic storage means, a plurality of magnetic head means adapted to record and extract information into and from said magnetic storage means by magnetic induction, each of said magnetic head means comprising a winding, a first means for electrically dividing each of said windings into a first portion and a second portion, said plurality of heads being arranged electrically in a rectangular coordinate array of rows and columns, a first circuit means to selectively condition the said first means of a given column of windings for the entry and extraction of information, a second circuit means adapted to condition the entry or extraction of information into or from the said storage means by means of a given row of magnetic heads, a third circuit means electrically connected across the magnetic heads of one of said rows and adapted to extract information from said storage means by means of a specific magnetic head of said row determined by said first circuit means and said second circuit means, a fourth circuit means associated with the first portion of said divided winding and adapted to read a first type of information into said magnetic storage means by means of a selected magnetic head, a fifth circuit means associated with the second portion of said divided winding and adapted to read information of a second type into said magnetic storage means by means of a selected magnetic head, said system comprising a first plurality and a second plurality of asymmetrical devices associated with each row of magnetic head windings, said first plurality as asymmetrical devices connecting first end terminals of each of said magnetic head windings in the associated row to a first common terminal individual to said associated row, said second plurality of asymmetrical devices connecting second end terminals of each of said magnetic head windings in the associated row to a second common terminal individual to said associated row, said first common terminal being associated with said third circuit means and said fourth circuit means, and said second common terminal being associated with said third circuit means and said fifth circuit means.

14. A magnetic storage system comprising magnetic storage means, a plurality of magnetic head means adapted to record and extract information into and from said magnetic storage means by magnetic induction, each of said magnetic head means comprising a winding, a first means for electrically dividing each of said windings into a first portion and a second portion, said plurality of heads being arranged electrically in a rectangular coordinate array of rows and columns, a first circuit means to selectively condition the said first means of a given column of windings for the entry and extraction of information, a second circuit means adapted to condition the entry or extraction of information into or from the said storage means by means of a given row of magnetic heads, a third circuit means adapted to extract information from said storage means by means of a specific magnetic head determined by said first circuit means and said second circuit means, a fourth circuit means associated with the first portion of said divided winding and adapted to read a first type of information into said magnetic storage means by means of a selected magnetic head, a fifth circuit means associated with the second portion of said divided winding and adapted to read information of a second type into said magnetic storage means by means of a selected magnetic head in which each row of magnetic head windings has associated therewith an individual first common terminal and an individual second common terminal, a first plurality of asymmetrical devices individually connecting each of the first end terminals of each of the magnetic head windings in each row to the said first common terminal associated therewith, a second plurality of asymmetrical devices individually connecting each of second end terminals of each of the magnetic head windings in each row to the said second common terminal associated therewith, said first common terminal associated with a given row of magnetic heads comprising the input terminal into a selected head in said given row from said fourth circuit means, said second common terminal associated with a given row of magnetic heads forming the terminal into a selected head in said given row from said fifth circuit means, and said first and second common terminals associated with a given row forming the output terminals for voltages induced in magnetic heads in said given row, said output terminals being electrically connected to said third circuit means.

15. A memory system for magnetic storage of binary information at a plurality of separately defined magnetic positions having storage position selection means comprising in combination, a magnetic core with a two section winding having two end taps and an intermediate tap, unidirectional conductive means coupled to each end tap to pass current through the separate winding sections to said intermediate tap in opposite directions, a biasing source, a switching circuit for selectively biasing the unidirectional means by coupling said source to the intermediate tap and thereby to forwardly bias both said unidirectional conductive means to pass direct current through said winding sections in opposite directions, signal input means applied to one of said unidirectional means to selectively permit current flow from said source through one of the two winding sections and through said one of the unidirectional means to magnetically store a signal of a binary polarity determined by the winding section selected, and signal output means electrically connected across said two winding sections for detecting signals induced in said winding only when said switching circuit forwardly biases said unidirectional means.

16. A magnetic core adapted to selectively store binary signals, a two section winding about said core, means for passing unidirectional circulating current simultaneously in opposite directions but in substantially equal magnitudes through the sections of said winding, and signal input means for selectively unbalancing the said current flow through the winding sections to magnetically store a signal of a binary polarity determined by the direction of unbalance.

17. A system for selection of a predetermined subset of a plurality of magnetic cores for mounting adjacent to a movable magnetic surface comprising in combination, a two section winding about each core having end taps and an intermediate tap, unidirectional conductive means coupled to each end tap of each of said windings to pass current through the separate winding sections thereof to its intermediate tap in opposite directions, and means including a voltage source and switching circuitry for selectively passing circulating direct current of substantially equal magnitudes but in opposite directions through the two winding sections, the intermediate tap and said unidirectional means of only a selected subset of at least one said cores to thereby condition said one core for magnetically reading binary stored signal.

18. A system as defined in claim 17 wherein a writing circuit is provided including signal input means for selectively increasing the current through only one of said winding sections to thereby magnetically store a signal of one binary polarity.

19. A system as defined in claim 17 including means coupled to both said end taps of the selected winding for reproducing a previously stored signal.

20. A system as defined in claim 18 further including a pair of conductors connected to respective ones of said unidirectional conductive means of a plurality of windings at terminals remote from the end taps of the windings, a readout circuit including a transformer having a primary winding connected across said pair of conductors for processing the previously stored signal and gating means for enabling said read-out circuit during read-out only and for disabling it at all other times.

21. A memory system for magnetic storage of binary information at a plurality of separately defined magnetic positions having storage position selection means comprising in combination, a magnetic core with a winding having two end taps and having an intermediate tap for establishing an electrical position between said end taps, thereby defining two winding sections, unidirectional conductive means coupled to each end tap to pass current through the conductive circuit to said intermediate tap in opposite directions, a biasing source, a switching circuit for selectively biasing the unidirectional means by coupling said biasing source to the intermediate tap and thereby to bias said unidirectional conductive means both selectively to cutoff and conductive conditions, signal writing means for selectively altering the current flow in one of the two winding sections to magnetically store a signal of a binary polarity determined by the winding section selected, and inductive signal reading means having two end taps coupled to the end taps of said winding and further having an intermediate tap coupled in circuit with the intermediate tap of said winding, the reading means including further unidirectional conductive means poled to pass continuous direct current from said biasing source through said magnetic core winding and said inductive signal reading means.

22. An electronic switching system for enabling the recording of signals on, and the playing back of signals from, a recording medium and comprising a matrix including a plurality of record-playback means connected in rows and columns, a plurality of row buses, each row bus being associated with a different row of record-playback means, means for connecting each record-playback means to its associated row bus, a plurality of column buses, each column bus being associated with a different column of record-playback means, rectifying means for connecting each of said record-playback means to the associated column bus and poled in a direction to enable the flow of current toward each column bus, a plurality of signal translating means each having control, output, and common electrodes, the ouput electrode of each signal translating means being connected to a different column bus and connected to all of said row buses through said column buses and said record-playback means, said signal translating means enabling the passage of current from said output electrode to said common electrode when both said output electrode and said control electrode are biased to their respective operating points, first switching means connected to all of said row buses for energizing a selected row and for disabling all other rows, second switching means connected to said first switching means for connecting either recording or playback potential to said selected row, said recording potential being applied to said output electrode of said signal translating means through said record-playback means in said selected row and having a magnitude equal to the operating potential of said output electrode, a plurality of actuating gates each having an ouput line and two input lines, the output line of said actuating gate being unenergized unless both input lines thereof are energized, an actuating gate being connected to the control electrode of each different signal translating means, third switching means for energizing a selected column and connected to one of said input lines of each actuating gate, a source of recording signals connected to the other of said input lines of each actuating gate for impressing signals indicative of information on the selected record-playback means when it is desired to record, and a playback amplifier connected to said output electrodes of said signal translating means for amplifying and utilizing playback signals played back.

23. An electronic switching system for selecting one of a plurality of center-tapped coils arranged in a matrix of rows and columns and for determining whether the selected coil is to be utilized to enable the recording or playing back of signals, said switching system comprising a plurality of row buses each being associated with a different row of said coils; means for connecting the center taps of said coils to the associated row bus; a plurality of column buses arranged in pairs, one pair being associated with each of said columns of coils; means for connecting each of said coils between the associated pair of column buses; a plurality of electron discharge devices having plate, grid, and cathode electrodes and arranged in pairs, the plate of each of said electron discharge devices being connected to a different one of said column buses; row selecting means connected to all of said row buses for applying positive potential to a selected row of said coils and negative potential to all other coils thereby to apply said positive potential to said plate of each of said electron discharge devices through said selected row of coils; switching means connected to said row-selecting means for varying said positive potential to the operating voltage of said plates when it is desired to record and to a low positive value when it is desired to play back; a plurality of actuating gates each having an output line and first and second input lines, said output line transmitting a signal pulse only when both said first and second input lines are simultaneously energized; means for connecting said output line of each of said actuating gates to the grid of a different electron discharge device; column selection means connected to said first input lines of each said actuating gates for applying positive potential to the first input line of the actuating gates associated with a selected column; a plurality of playback gates each being associated with a different column of said coils and each having one output line and first and second input lines, said output line transmitting a signal pulse only when said first and second input lines are simultaneously energized; means for connecting each of said first input lines of said playback gate to said first input lines of the actuating gates associated with the same column; means for connecting each of said second input lines of said playback gates to one of said electron discharge devices in a different pair; a playback amplifier; means connecting said output lines of said playback gates to said playback amplifiers; first and second sources of recording signals; means connecting said first source of recording signals to said second input lines of the actuating gates associated with said one of said electron discharge devices in every column and means connecting said second source of recording signal to said actuating gates associated with the electron discharge devices with every other of said electron discharge device.

24. An electronic switching system for enabling the recording of signals on, and the playing back of signals from a storage means comprising a matrix including a plurality of entry and pickup devices associated with said storage means, said entry and pickup devices each including a center-tapped winding and a flux-directing element for providing a flux path between said winding and said storage means, rectifying means connected to each end of each coil with opposing polarity, a first plurality of conductors, means connecting the center taps of said coils in separate groups with corresponding separate members of said first plurality of conductors, means for selectively applying different potentials to the members of said first plurality of conductors, a second plurality of conductors, means connecting separate groups of said entry and pickup devices through said opposingly poled rectifiers between separate pairs in said second plurality of conductors, each of said second groups including one device from each of said first groups, a plurality of electric valves each connected respectively with one of the conductors comprising said second group, means connecting a first signal source with the valves associated with one conductor of each of said pairs, means connecting a second signal source with the valves associated with the other conductor of each of said pairs, and a plurality of separate signal responsive means each electrically connected across one of said pairs of second plurality of conductors.

25. In a magnetic recording and reading system the combination of, a pair of conductors, means to apply to said conductors electrical signals representative of data to be recorded, a plurality of magnetic devices each of which includes a magnetic core, a winding on said core, a plurality of pairs of asymmetrically conductive devices each of which pairs is connected serially with the winding of a respective one of the magnetic devices between said conductors, means selectively conditioning the pair of asymmetrically conductive devices associated with the winding of a selected magnetic device to conduct data signals applied to said conductors, whereby the winding of the selected magnetic device is enabled to receive data signals from said conductors for recording and to apply to said conductors signals generated in said winding by flux changes in said core during reading, means to control said data signal applying means to apply signals to said conductors for recording by the selected magnetic device, a signal utilization means, and means coupled to said conductors to apply to said utilization means signals applied to said conductors by the windings of the selected magnetic device.

26. A data storage system comprising a plurality of magnetic devices each having a center tapped winding for passing an electrical signal during writing and for generating an electrical signal during reading, a pair of signal transfer lines which are adapted to convey such electrical signals representing information to be recorded and read, a plurality of pairs of asymmetrically conductive devices each of which pairs is connected serially with one of said center-tapped windings between said two signal transfer lines, means applying a gating signal to the center tap of the winding of any selected one of said magnetic devices for conditioning the asymmetrically conductive devices connected serially therewith to conduct information signals applied to said signal transfer lines, whereby the selected winding of the selected magnetic device is enabled to conduct information signals applied to said signal transfer lines, and a signal output circuit electrically connected to said signal transfer lines for passing signals representing the difference in potential generated in said winding during reading.

27. A magnetic storage system comprising, a pair of conductors, a plurality of magnetic devices each having an electrically bisected winding, a like plurality of pairs of asymmetrically conductive devices, the respective devices of each pair being series connected with the respective ones of the winding sections of the corresponding magnetic device, and the respective series combinations of each of the resulting pairs of series combinations being connected between a respective one of the pair of conductors and a common junction, means selectively operable to apply a predetermined electric potential to any selected one of said junctions to condition any selected pair of asymmetrically conductive devices to conduct information signals applied to said pair of conductors, whereby the winding of the associated magnetic device is enabled for applying to said conductors signals generated in said winding in reading and for receiving from said conductors electrical signals for writing, a signal utilization means, means coupled to said conductors for applying to said utilization means signals applied to said conductors by the winding of the selected magnetic device in reading, and means for applying to said conductors signals for writing by the selected magnetic device.

28. A magnetic storage system comprising a plurality of magnetic devices each including an electrically bisected winding, a like plurality of first conductors, an electric current supply means having first and second terminals of different electric potentials, a plurality of first pairs of asymmetrically conductive devices including one pair for each of said magnetic devices and each asymmetrical device of the pair being connected in series with a respective one of the two winding sections of the respective magnetic device, a pair of second conductors, the two series connected combinations of asymmetrically conductive devices and winding sections of each of said individual magnetic devices being connected between one of said first conductors and a respective one of said pair of second conductors, circuit means of equal impedances connecting each of said second conductors to said second supply terminal, means to selectively connect conductors of said first plurality individually to said first supply terminal, said asymmetrical devices being oriented for forward conduction of current from the supply terminal of higher potential to the supply terminal of lower potential, the two winding sections of each magnetic device being connected for balanced opposition of the magnetizing effects of currents from said supply means flowing through them in the absence of a signal, and a single output circuit responsive to all of said magnetic devices for detecting the presence of a signal in the windings of any of said magnetic devices.

29. A magnetic storage system comprising a plurality of magnetic devices each including an electrically bisected winding, a like plurality of first conductors, an electric current supply means having first and second terminals of different electric potentials, a plurality of first pairs of asymmetrically conductive devices including one pair for each of said magnetic devices and each asymmetrical device of the pair being connected in series with a respective one of the two winding sections of the respective magnetic device, a pair of second conductors, the two series connected combinations of asymmetrically conductive devices and winding sections of each of said individual magnetic devices being connected between one of said first conductors and a respective one of said pair of second conductors, circuit means of equal impedances connecting each of said second conductors to said second supply terminal, means operable to selectively connect conductors of said first plurality individually to said first supply terminal, said asymmetrical devices being oriented for forward conduction of current from the supply terminal of higher potential to the supply terminal of lower potential, the two winding sections of each magnetic device being connected for balanced opposition of the magnetizing effects of currents from said supply means flowing through them in the absence of a signal, means to apply to said second conductors electrical pulses representative of data to be stored, and a single output circuit electrically connected to said pair of second conductors for detecting the presence of a signal induced in the windings of any of said magnetic devices.

30. A magnetic storage system comprising a plurality of magnetic devices each including an electrically bisected winding, a like plurality of first conductors, an electric current supply means having first and second terminals of different electric potentials, a plurality of first pairs of asymmetrically conductive devices including one pair for each of said magnetic devices and each asymmetrical device of the pair being connected in series with a respective one of the two winding sections of the respective magnetic device, a pair of second conductors, the two series connected combinations of asymmetrically conductive devices and winding sections of each of said individual magnetic devices being connected between one of said first conductors and a respective one of said pair of second conductors, a further pair of asymmetrically conductive devices, a read-out coupling transformer having a bisected primary winding, each primary section being connected in series combination with a respective one of the asymmetrically conductive devices of said further pair between said second supply terminal and a respective one of said second conductors, means operable to selectively connect conductors of said first plurality individually to said first supply terminal, said asymmetrical devices being oriented for forward conduction of current from the supply terminal of higher potential to the supply terminal of lower potential, the two primary winding sections of said transformer and the two winding sections of each magnetic device being connected for balanced opposition of the magnetizing effects of currents from said supply means flowing through the two sections of the same winding in the absence of signal.

31. A magnetic storage system comprising a plurality of magnetic devices each including an electrically bisected winding, a like plurality of first conductors, an electric current supply means having first, second and third terminals of different electric potentials, the potential of said second terminal being intermediate the potentials of said first and third terminals, an individual relatively high impedance connecting each of said first conductors to said third supply terminal, a plurality of pairs of asymmetrically conductive devices including one pair for each of said magnetic devices and each asymmetrical device of the pair being connected in series with a respective one of the two winding sections of the respective magnetic device, a pair of second conductors, the two pairs of series connected combinations of asymmetrically conductive devices and winding sections of each of said individual magnetic devices being connected between one of said first conductors and a respective one of said pair of second conductors, circuit means of equal impedances connecting each of the conductors of the second pair to said second supply terminal, means operable to selectively connect conductors of said first plurality individually to said first supply terminal, each of said asymmetrical devices being oriented to present high impedance to flow of current through it between said second and third supply terminals and low impedance to flow of current through it between said first and second supply terminals, the two winding sections of each magnetic device being connected for balanced opposition of the magnetizing effects of currents from said supply means flowing through them in the absence of a signal, and an output circuit electrically connected across said pair of second conductors for detecting the presence of a signal induced in the windings of any of said magnetic devices.

32. A magnetic storage system comprising a plurality of magnetic devices each including an electrically bisected winding, a like plurality of first conductors, an electric current supply means having first and second terminals of different electric potentials, a plurality of first pairs of asymmetrically conductive devices including one pair for each of said magnetic devices and each asymmetrical device of the pair being connected in series with a respective one of the two winding sections of the respective magnetic device, a pair of second conductors, the two series connected combinations of asymmetrically conductive devices and winding sections of each of said individual magnetic devices being connected between one of said first conductors and a respective one of said pair of second conductors, a further pair of asymmetrically conductive devices, read-out coupling means having output means and electrically bisected input circuit means each section of which is connected in series with a respective one of said further pair of asymmetrical devices between a respective one of said second conductors and said second supply terminal, means to selectively connect conductors of said first plurality individually to said first supply terminal, said asymmetrical devices being oriented for forward conduction of current from the supply terminal of higher potential to the supply terminal of lower potential, the two winding sections of each magnetic device being connected for balanced opposition of the magnetizing effects of currents from said supply means flowing through them in the absence of a signal, and the two sections of the input circuit means of said read-out coupling means being connected to cause currents from said supply means flowing through them in the absence of a signal to have balanced opposed effects upon said output means.

33. A magnetic storage system comprising a plurality of magnetic devices each including an electrically bisected winding, a like plurality of first conductors, an electric current supply means having first, second and third terminals of different electric potentials, the potential of said second terminal being intermediate the potentials of said first and third terminals, an individual relatively high impedance means connecting each of said first conductors to said third supply terminal, a plurality of first pairs of asymmetrically conductive devices including one pair for each of said magnetic devices and each asymmetrical device of the pair being connected in series with a respective one of the two winding sections of the respective magnetic device, a pair of second conductors, the two series connected combinations of asymmetrically conductive devices and winding sections of each of said individual magnetic devices being connected between one of said first conductors and a respective one of said pair of second conductors, a further pair of asymmetrically conductive devices, read-out coupling means having output means and electrically bisected input circuit means each section of which is connected in series with a respective one of said further pair of asymmetrical devices between a respective one of said second conductors and said second supply terminal, means operable to selectively connect conductors of said first plurality individually to said first supply terminal, each of said asymmetrical devices being oriented to present high impedance to flow of current through it between said second and third supply terminals and low impedance to flow of current through it between said first and second supply terminals, the two winding sections of each magnetic device being connected for balanced opposition of the magnetizing effects of currents from said supply means flowing through them in the absence of a signal, and the two sections of the input circuit means of said read-out coupling means being connected to cause currents from said supply means flowing through them in the absence of a signal to have balanced opposed effects upon said output means.

34. The combination as defined in claim 25 wherein said means to apply signals to said utilization means includes coupling means for passing signals representing differences in potential between said conductors and for balancing out transient signals occurring on said conductors during changes in the conduction state of said asymmetrically conductive devices.

35. The combination as defined in claim 34 wherein said coupling means includes a transformer winding and means to connect said winding in balanced relation to said pair of conductors.

36. An electronic selector stage for producing in any selected one of a plurality of loads two sequential current pulses of opposite sense comprising a row-and-column array of load-energising windings each of which is electrically divided into two parts by an intermediate tapping, connected to each column of windings column-selecting discharge tubes each having at least a cathode, an anode, and an intermediate control grid electrode, the tubes being included in the connection to the intermediate tapping of each winding in that column, individual to each row of windings a pair of sense-determined discharge tubes each tube having at least a cathode, an anode, and an intermediate control grid electrode, the two tubes of each pair being associated with the circuits of one and the other, respectively, of the said parts of each winding of that row, driving means for energising by each of two sequential voltage pulses the column-selecting tube of the column containing the winding for energising the selected load, and control means for so controlling the sense-determining discharge tubes of the row containing that winding as to ensure that said two pulses energise said two parts of the winding sequentially, thereby energising the selected load in opposite senses.

37. A magnetic data storage system, comprising a plurality of magnetic devices each having a winding including first and second sections wound about a core, said windings being arranged in a matrix of rows and columns, a voltage source, circuit means for selectively applying said voltage source to all of the windings in a selected column for establishing a circulating current flow in opposite directions simultaneously through closed circuits including the two sections of all of the windings in such selected column, and switching means for selectively establishing an additional closed circuit connection through just one section of all of the windings of only a selected row, to permit an increase of current flow from said voltage source through just one section of one winding and through said switching means, whereby a selected core is energized to record a "1" or a "0."

38. A magnetic data storage system, comprising a magnetic device including a winding, a pair of conductors, a pair of diodes serially connected in opposed relationship with said winding between said conductors, gating means for selectively biasing both of said diodes simultaneously into a conducting state wherein a substantial current flows simultaneously through both said diodes, and recording means for applying to said conductors signals to be recorded thereby to impress said signals on at least a portion of said winding.

39. A magnetic data reading and recording system, comprising a magnetic device including a magnetic core, a winding on said core, a pair of conductors, a pair of diodes serially connected in opposed relationship with said winding between said conductors, gating means for selectively biasing said diodes into a conducting state to produce a substantial circulating current flow through said diodes, recording circuit means for applying to said conductors signals to be recorded thereby to impress said signals on at least a portion of said winding, reading circuit means for receiving from said conductors further signals developed across said winding by flux changes in said core during reading, and gating means for connecting said recording circuit means to said conductors during recording, while disconnecting said reading circuit means, and for connecting said reading circuit means to said conductors during reading, while disconnecting said recording circuit means.

40. A data storage system for storing data signals in magnetic material which is capable of assuming alternate stable states of magnetic remanence, comprising a plurality of winding magnetically coupled to said magnetic material and arranged in rows and columns, a plurality of row buses, a plurality of pairs of asymmetrically conductive devices each of which pairs is connected serially in back to back relationship with one of said windings between a pair of said row buses, a plurality of electric terminals each connected to a junction between a pair of said asymmetrically conductive devices, a plurality of column buses each of which electrically connects all of said terminals of a single column, means for applying a voltage to a selected one of said column buses so as to forwardly bias the asymmetrically conductive devices of said column, switching means for selectively establishing a closed circuit connection in one of said row buses to permit current flow from the selected column bus through at least one of said asymmetrically conductive devices and at least a portion of one of said windings, and separate reading circuit means connected across each said pair of row buses for reading out voltage signals developed across the row of windings associated with the respective pairs of row buses, said voltage being developed as a result of flux changes in the area of said windings.

41. A storage system according to claim 40 further including gating means for enabling said reading circuit means only during reading and disabling it at all other times.

42. A magnetic data recording system, comprising a plurality of magnetic devices each including a winding, a plurality of pairs of diodes, respective pairs of said diodes being serially connected in opposed relationship with each of said windings, gating means for selectively biasing the pairs of diodes in a first group of said series circuits to produce a circulating current flow through each diode of said first group, recording circuit means for applying to a second group of said series circuits an electric signal to be recorded in a selected one of said devices, said selected one being common to said first and second groups.

43. A matrix for resolving X lines of one coordinate and Y discrete pairs of lines of another coordinate into a total of X times Y lines, where X and Y are positive integers greater than one, means interconnecting said X lines, and said Y discrete pairs of lines at each coordinate intersection, each of said means comprising a transformer having first and second primary windings, said first primary winding being in series with a first unilateral conducting device connecting the X line of one coordinate and a first Y line of said discrete pair of Y lines, a second unilateral conducting device opposingly poled to said first unilateral conducting device and serially connecting said second primary winding to said X line and the second Y line of said discrete pair of Y lines, core means associated with each of said transformers for generating voltages in respective ones of said first and second primary windings, and utilization means electrically connected to said Y discrete pairs of lines for receiving said generated voltages.

44. A matrix system for resolving X lines and Y discrete pairs of lines into a total of X times Y lines, where X and Y are positive integers greater than one, said matrix comprising a plurality of transformers, each transformer including a primary winding with a center-tap, said center-tap being connected to said X lines, a plurality of electrical circuits connected from one to the other line of each pair of said Y discrete pairs of lines, said electrical circuits each comprising a first unilateral conducting device, one of the said primary windings with a center-tap and a second unilateral conducting device serially connected in the order listed, means connected to said X lines and said Y discrete pairs of lines for selectively energizing one-half of one of said transformer primary windings with a center-tap, a further plurality of transformers each of which is electrically connected across one pair of said Y discrete pairs of lines, and a plurality of pairs of unilateral conducting devices interconnected electrically with the respective transformers of said further plurality of transformers between said Y discrete pairs of lines, the unilateral conducting devices of each said pair being poled opposite to each other and opposite to said first and second unilateral device.

References Cited in the file of this patent

UNITED STATES PATENTS

| | | |
|---|---|---|
| 1,331,151 | Hopkins | Feb. 17, 1920 |
| 1,547,964 | Semat | July 28, 1925 |
| 2,139,079 | Haselton | Dec. 6, 1938 |
| 2,342,886 | Murphy | Feb. 29, 1944 |
| 2,476,066 | Rochester | July 12, 1949 |
| 2,540,654 | Cohen | Feb. 6, 1951 |
| 2,564,403 | May | Aug. 14, 1951 |
| 2,570,716 | Rochester | Oct. 9, 1951 |
| 2,611,025 | Jankowski | Sept. 16, 1952 |
| 2,849,703 | Binden | Aug. 26, 1958 |

UNITED STATES PATENT OFFICE
CERTIFICATE OF CORRECTION

Patent No. 2,932,008                      April 5, 1960

George G. Hoberg

It is hereby certified that error appears in the printed specification of the above numbered patent requiring correction and that the said Letters Patent should read as corrected below.

Column 5, lines 18 and 19, strike out "either section of" and insert the same before "winding, in line 17, same column; column 9, line 39, for "head" read -- heads --; column 11, line 54, for "power" read -- lower --; column 14, line 6, for "point" read -- points --; column 15, line 34, for "to" read -- by --; line 69, for "inforamtion" read -- information --; line 74, strike out "system,"; column 17, line 9, for "respective" read -- responsive --; line 68, for "as" read -- of --; column 18, line 28, after "head" insert a comma; column 19, line 18, before "said", first occurrence, insert -- of --; line 34, after "signal" insert a comma; column 20, line 63, after "each" insert -- of --; column 21, line 10, for "device" read -- devices --; line 19, for "opposing" read -- opposite --; column 23, line 50, after "impedance" insert -- means --; column 25, lines 24 and 25, for "sense-determined" read -- sense-determining --; line 50, for "increase of" read -- increased --; line 58, after "biasing" strike out the comma; column 26, line 10, for "winding" read -- windings --.

Signed and sealed this 18th day of April 1961.

(SEAL)

Attest:

ERNEST W. SWIDER                        DAVID L. LADD

Attesting Officer                         Commissioner of Patents